(12) United States Patent
Hine

(10) Patent No.: US 12,525,148 B2
(45) Date of Patent: Jan. 13, 2026

(54) CHEST TUBE AND PERICARDIOCENTESIS TRAINER APPARATUS

(71) Applicant: HALO Med LLC, Scarborough, ME (US)

(72) Inventor: Jason F Hine, Scarborough, ME (US)

(73) Assignee: HALO MED LLC, Scarborough, ME (US)

( * ) Notice: Subject to any disclaimer, the term of this patent is extended or adjusted under 35 U.S.C. 154(b) by 419 days.

(21) Appl. No.: 18/255,051

(22) PCT Filed: Dec. 3, 2021

(86) PCT No.: PCT/US2021/061901
§ 371 (c)(1),
(2) Date: May 30, 2023

(87) PCT Pub. No.: WO2022/120238
PCT Pub. Date: Jun. 9, 2022

(65) Prior Publication Data
US 2024/0038098 A1 Feb. 1, 2024

Related U.S. Application Data

(60) Provisional application No. 63/121,808, filed on Dec. 4, 2020.

(51) Int. Cl.
*G09B 23/32* (2006.01)
(52) U.S. Cl.
CPC .................................. *G09B 23/32* (2013.01)
(58) Field of Classification Search
CPC ................................ G09B 23/30; G09B 23/32
See application file for complete search history.

(56) References Cited

U.S. PATENT DOCUMENTS

| 2004/0126746 | A1 | 7/2004 | Toly | |
| 2010/0311025 | A1* | 12/2010 | Everett | C08L 89/04 |
| | | | | 106/156.51 |
| 2012/0034587 | A1* | 2/2012 | Toly | G09B 23/30 |
| | | | | 434/267 |

(Continued)

OTHER PUBLICATIONS

International Search Report and Written Opinion, Mar. 3, 2022, 10pp.

*Primary Examiner* — James S. McClellan
(74) *Attorney, Agent, or Firm* — Caseiro Burke LLC; Nicholas A. McCrillis; Chris A. Caseiro

(57) ABSTRACT

A simulator apparatus for training medical professionals in the procedures of chest tube insertion and/or pericardiocentesis. The apparatus includes a first stand element and a second stand element that form a rib panel base with the two elements substantially at right angles to one another to create a 90-degree stand. A rib panel is removably joined to the two stand elements and includes curved slots representing the spaces between ribs. This allows for the insertion of chest tubes between the simulated rib spaces, using off-the-shelf supplies to create a subcutaneous and skin overlay. For training in pericardiocentesis, the rib panel can be placed on a standard dimension medical basin, which is filled with a training heart with a pericardial effusion created with off-the-shelf supplies. The basin is then filled with echogenic material (water, water and fiber supplement, or gelatin) that facilitates ultrasound.

16 Claims, 9 Drawing Sheets

(56) References Cited

U.S. PATENT DOCUMENTS

| | | | |
|---|---|---|---|
| 2013/0330698 A1* | 12/2013 | Yang | G09B 23/288 |
| | | | 434/265 |
| 2016/0314718 A1* | 10/2016 | Bergs | G09B 23/32 |
| 2017/0011655 A1* | 1/2017 | Sakezles | G09B 23/30 |
| 2017/0330488 A1* | 11/2017 | Kinsella | G09B 23/286 |
| 2018/0308394 A1* | 10/2018 | Segall | G09B 23/28 |
| 2019/0304339 A1* | 10/2019 | Williams | G09B 19/24 |
| 2020/0043371 A1 | 2/2020 | Mele et al. | |
| 2020/0372832 A1* | 11/2020 | Salvino | G09B 23/285 |
| 2022/0343798 A1* | 10/2022 | Takeuchi | G09B 23/285 |

\* cited by examiner

CHEST TUBE AND PERICARDIOCENTESIS TRAINER APPARATUS

BACKGROUND OF THE INVENTION

1. Field of the Invention

The present invention relates to the training of medical professionals in the procedures of chest tube insertion. More particularly, the present invention relates to apparatuses and methods for training medical professionals to carry out chest tube insertion including for, but not limited to, pericardiocentesis. Still more particularly, the present invention relates to a convenient, relatively inexpensive, and portable simulator apparatus designed to simulate the conditions associated with chest tube insertion.

2. Description of the Prior Art

Emergency medicine and other medical specialties are responsible for preforming several lifesaving procedures. Many of these procedures are rare, limiting the amount of skill maintenance that can be done with patient care. Procedural skill proficiency and competence can be maintained through simulation, but most active practicing clinicians do not have ready access to a simulation center. The training of medical professionals requires access to easy-to-use simulators which allow procedural skillset maintenance, as well as the training of medical students, residents, and other learners.

Many current trainers are complex, expensive, and are therefore only available to learners/practitioners who have access to a simulation center. Most currently practicing clinicians do not have ready access to a simulation center, have to pay significant costs for the use of a simulation center space and resources, and/or do not, given the above noted obstacles, utilize such facilities for a variety of reasons. This leads to procedural skill set decay, especially in uncommon and infrequent procedures. Having deliverable trainers, to the end users' homes or places of practice, would help eliminate many of these barriers to procedural training and, therefore, procedural skill maintenance.

A need therefore exists for low- to mid-fidelity simulators that can be utilized outside of a simulation center. In particular, practitioners would benefit from easy assembled, simple to use simulators that maintain the necessary fidelity to practice procedures, particularly ones that are rarely seen in clinical practice. Such a simulator would be useful in two important, but rarely executed medical procedures—chest tube insertion and pericardiocentesis.

SUMMARY OF THE INVENTION

The current invention provides a solution to the need for a simulator that aids in training users to carry out chest tube insertion and pericardiocentesis procedures. The invention is a medical procedure training simulator apparatus that facilitates the practice of chest tube insertion and pericardiocentesis. The simulator is in the form of an easy-to-ship product that can be utilized anywhere. Prior to this invention, the ability to practice these procedures in situ (where they practice medicine, an ideal location for training) or in the home environment, was not feasible to the training or practicing clinician due to lack of access, expense of materials or a combination of the above.

In an embodiment, the simulator is a three-part structure: a first stand element and a second stand element that are removably clipped together to form a rigid, 90-degree base, and a rib panel, which is removably clipped to the base. The combination of two-element base and rib panel is configured so that the simulator can lay on a standard-dimension medical basin for support and ease of access, but it can also be used in other settings. The rib panel is a frame, which may be a rectangular frame, with internal curved slot elements designed to mirror the anatomy of the human rib cage, and four winged clips, which allow the rib panel to clip on to, rest on, or otherwise be removably engaged with the base.

The first stand element has two or more clips protruding from an edge thereof, dependent on the specific configuration of the base to be formed, and two or more slots inset from an edge opposing the edge having the protruding clips. Alternatively, the first stand element has a multitude of hinge elements located on the edge thereof, dependent upon the specific configuration of the base to be formed, which engage with a multitude of hinge elements located on an edge of the second stand element. The edge associated with the slots may include a lip affixed thereto extending at about a 90-degree angle from that edge and arranged to enable the slot edge to be spaced above an underlying substrate when the simulator is assembled.

The second stand element has ports spaced from an edge thereof and corresponding in number to the number of clips of the first stand element. The ports of the second stand element have dimensions about the same as but slightly larger than the dimensions of the clips of the first stand element so that the clips of the first stand element and the ports of the second stand element can be removably joined together when the clips are inserted into the ports. When that joining is completed, the base of the simulator is established as an upright frame with the second stand element extending upwardly from the edge of the first stand element with the clips at an angle of about 90 degrees. The second stand element also has two or more slots inset from an edge opposing the edge having the ports.

The base formed by removably joining the first stand element and the second stand element together establishes an angled frame that is used to removably secure the rib panel therein. The rib panel includes a panel body having a first edge spaced from an opposing second edge. Each of the first and second edges includes two or more wings extending therefrom. The wings are configured to removably fit into the slots of the first and second stand elements, wherein the wings of the first edge of the panel fit into the slots of the first stand element and the wings of the second edge of the panel fit into the slots of the second stand element. When the rib panel is inserted into the base, the rib panel rests at an angle of about 45 degrees between the first stand element and the second stand element. The rib panel includes a panel body between the first edge and second edge. The panel body includes a set of parallel curved slots extending within a perimeter of the panel body, and corresponding parallel curved slats between slots. Curvature of the parallel curved slats is selected to represent human's ribs. The parallel curved slats may be aligned in a two- or three-dimensional manner.

The simulator of the present invention with the combination of the base and rib panel can be used to carry out chest tube insertion training. Specifically, the first and second stand elements are clipped together to create the base. The practitioner can then lay the rib panel into the base. The practitioner can then place off-the-shelf subcutaneous tissue and training skin overlays to allow for the practice of inserting chest tubes and pigtail catheters through the overlays and into the curved slots of the rib panel. At least one side of the rib panel may include attachment elements such as pegs, which attachment elements can be used to attach to overlays to panel.

In another embodiment, the simulator is a four-part structure: a first stand element and a second stand element that are removably clipped together with hinges to form a 90-degree base, a rib panel that is removably clipped to the first stand element with a hinge, and a fitted rib panel frame that is removably engaged to the rib panel. The rib panel frame is configured to mirror the shape of the rib panel with a middle cavity. The middle cavity of the rib panel frame allows the user access to the rib panel while the rib panel frame is engaged.

The hinge elements in the above embodiment function to engage the first stand element, second stand element, and rib panel together. The hinges allow for the invention to remain connected but facilitate easier transportation and storage. The hinge elements serve to hold each element in place while the simulator is in use. Additionally, the rib panel may be configured with a latch feature aligned to receive the second edge of the second stand element. The hinges allow for the invention to be expanded back into working condition and the latch of the rib panel engages with the second edge of the second stand element to secure the device in place for use.

The rib panel frame is a continuous piece shaped to mirror the outer edge of the rib panel. The rib panel frame has a middle cavity and a multitude of pins. The pins are aligned to be removably engaged with the rib panel to secure the rib panel frame to the rib panel. The middle cavity is aligned to allow access to the curved slots, mirroring the ribs of a human. It is possible to configure the curvature to enable tube insertion for other animals. The off-the-shelf subcutaneous tissue and training skin overlay is placed on the rib panel with the edges of the tissue overlapping the outer edge of the rib panel. The rib panel frame is then placed over the tissue and overlays and secured to the rib panel via the multitude of pins. The attachment of the rib panel and rib panel frame secures the tissues and overlays in place while the user uses the simulator.

The rib panel of the simulator can also separately be used to provide pericardiocentesis training. The rib panel may be sized and shaped to lay within a standard medical basin. During training of pericardiocentesis, the practitioner lays a simulation heart composed of off-the-shelf materials into the basin with water, water and fiber supplement, gelatin, or other substance to facilitate ultrasound use. The rib panel or rib panel with rib panel frame is then laid atop the medical basin. A training skin can then be laid over the rib panel and the practitioner can practice the procedure of pericardiocentesis, or drainage of fluid from around the heart.

The simulator of the present invention, including the combination of the base and rib panel or the rib panel alone, can be used in a convenient way in most any location to enable training for chest tube insertion or pericardiocentesis.

BRIEF DESCRIPTION OF THE DRAWINGS

The foregoing features of the invention will be more readily understood by reference to the accompanying drawings, in which.

DETAILED DESCRIPTION OF THE INVENTION

Figure 1:
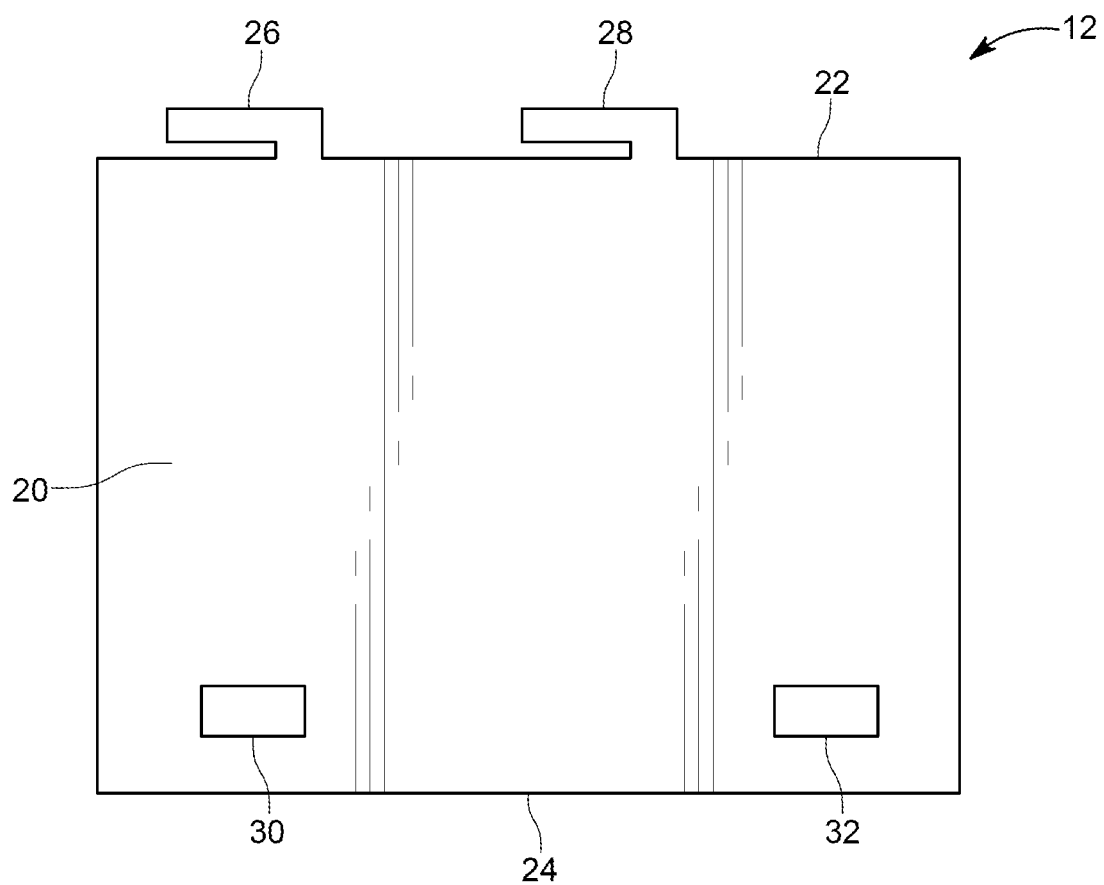
FIG. 1 is a plan view of the first stand element of the base of a first embodiment of the simulator apparatus of the present invention.
Figure 2:
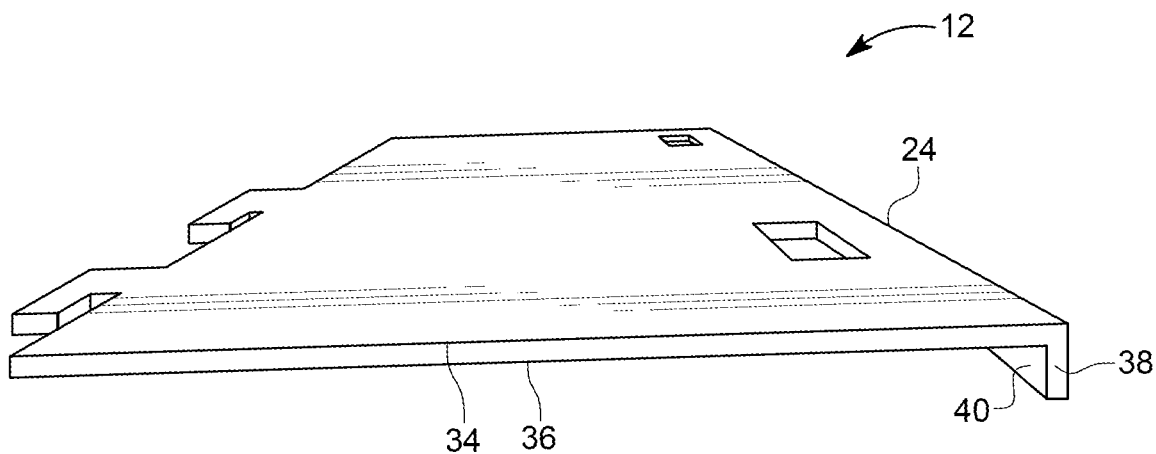
FIG. 2 is a side view of the first stand element.
Figure 3:
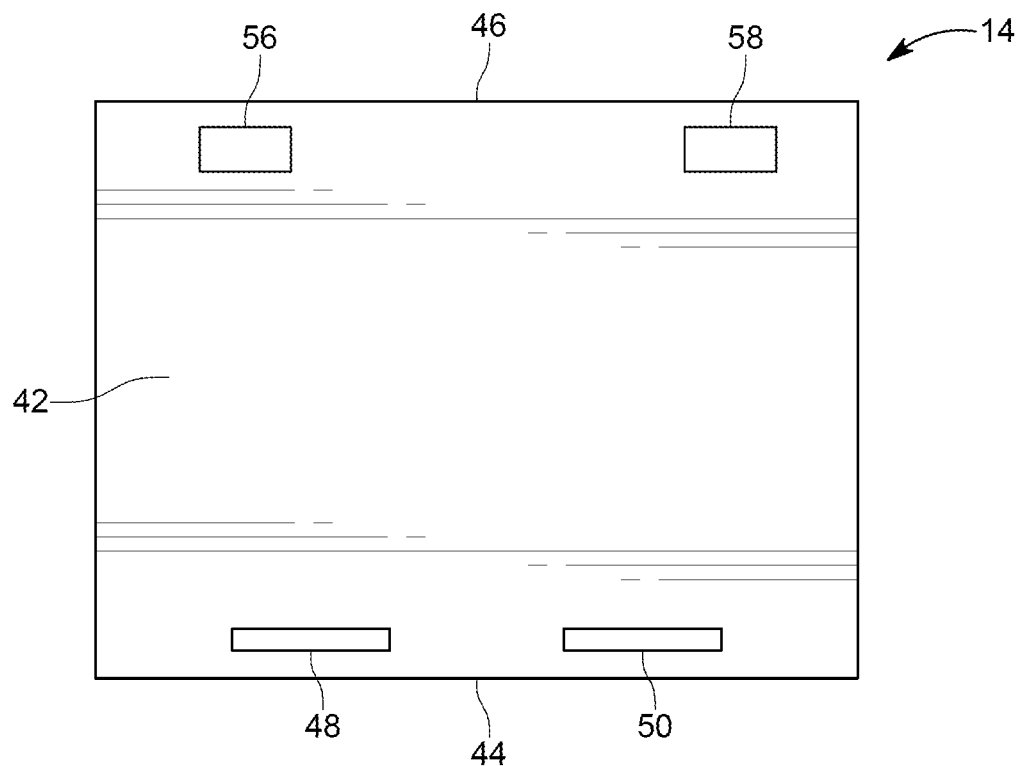
FIG. 3 is a plan view of the second stand element of the base.
Figure 4:
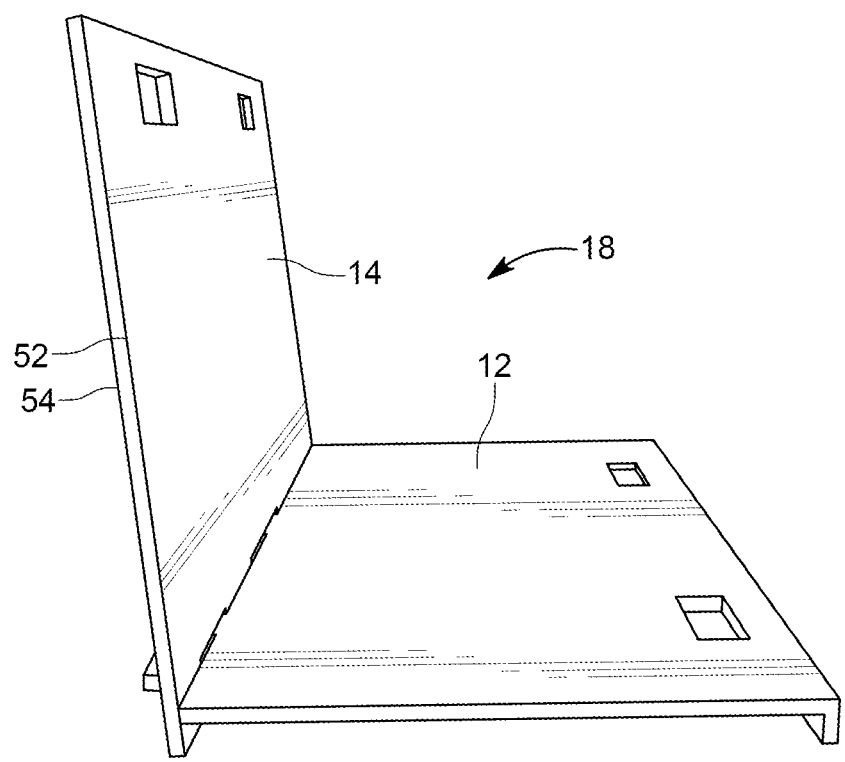
FIG. 4 is a side perspective view of the first stand element and second stand element joined together to form the base of the simulator apparatus.
Figure 5:
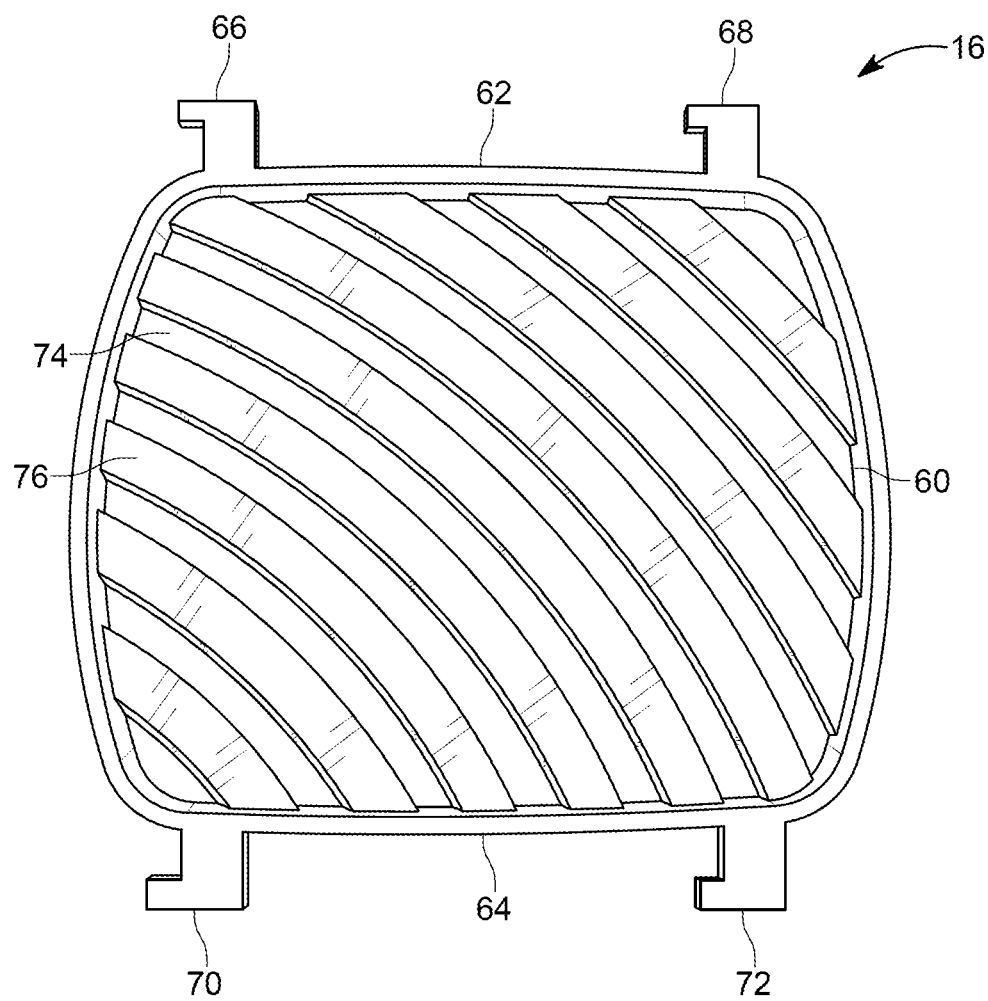
FIG. 5 is a plan view of the rib panel of the present invention.
Figure 6:
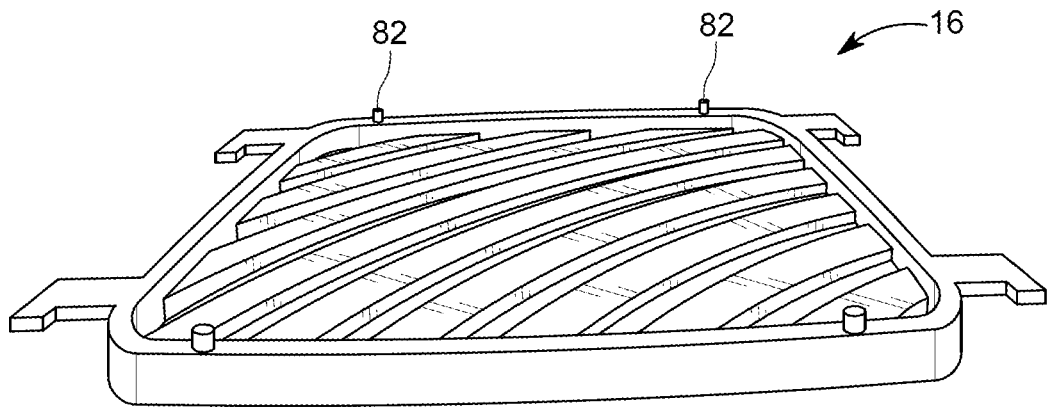
FIG. 6 is a side view of the rib panel.
Figure 7A:
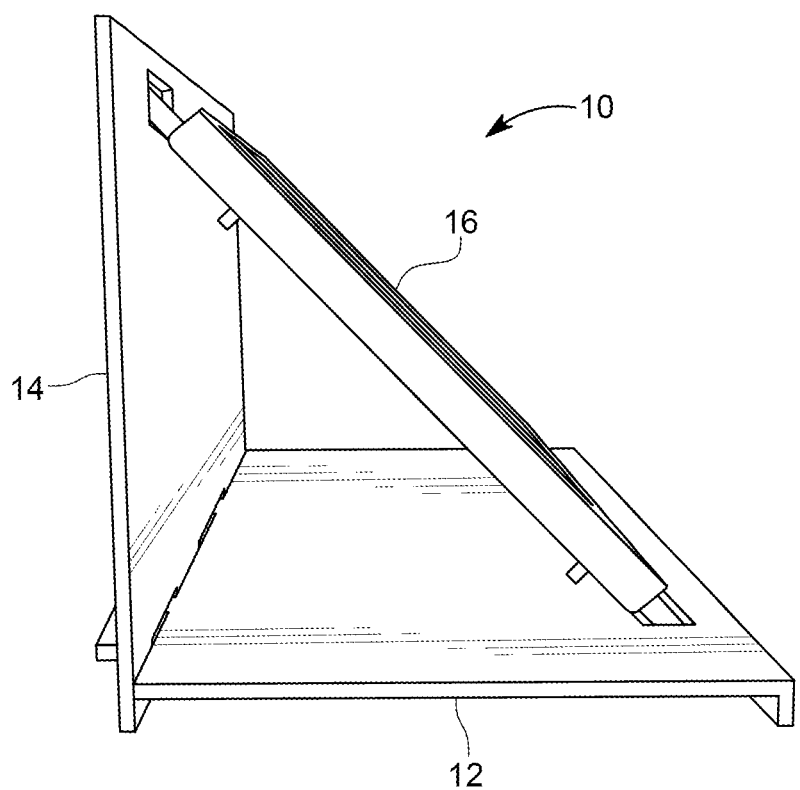
FIG. 7A is a side view of the simulator apparatus of the present invention for the purpose of training chest tube insertion.
Figure 7B:
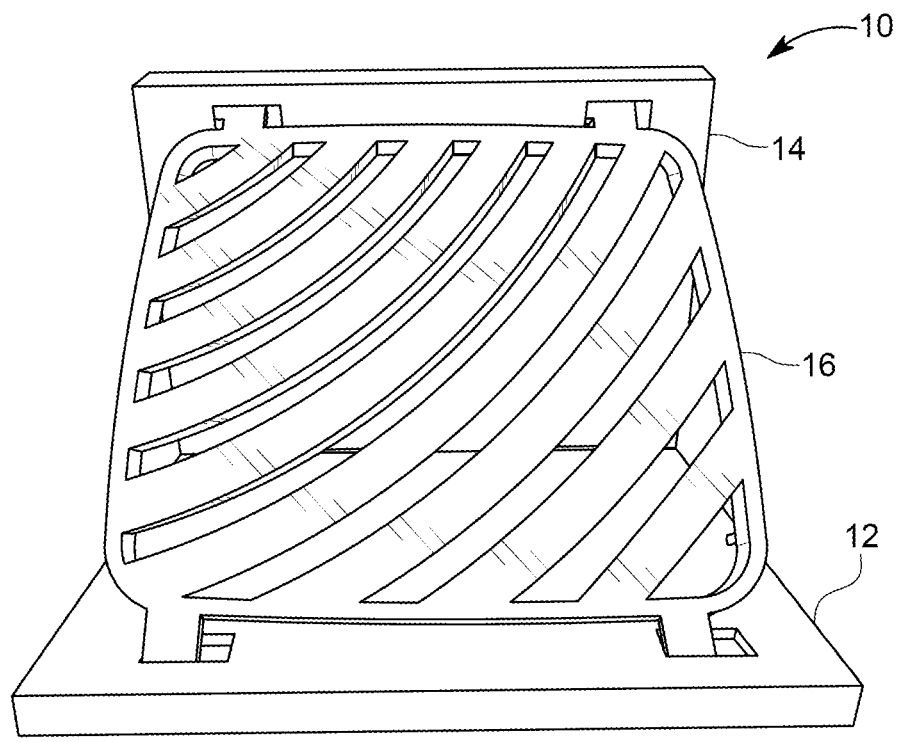
FIG. 7B is a front view of the simulator of FIG. 7A.
Figure 8A:
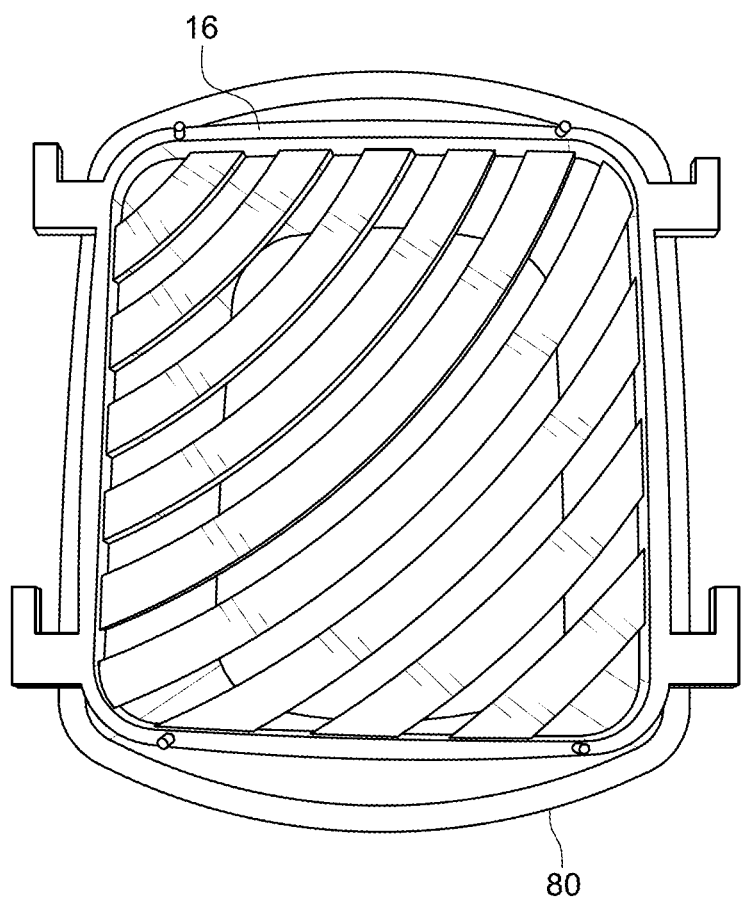
FIG. 8A is a plan view of the rib panel atop a medical basin for the purpose of training pericardiocentesis.
Figure 8B:
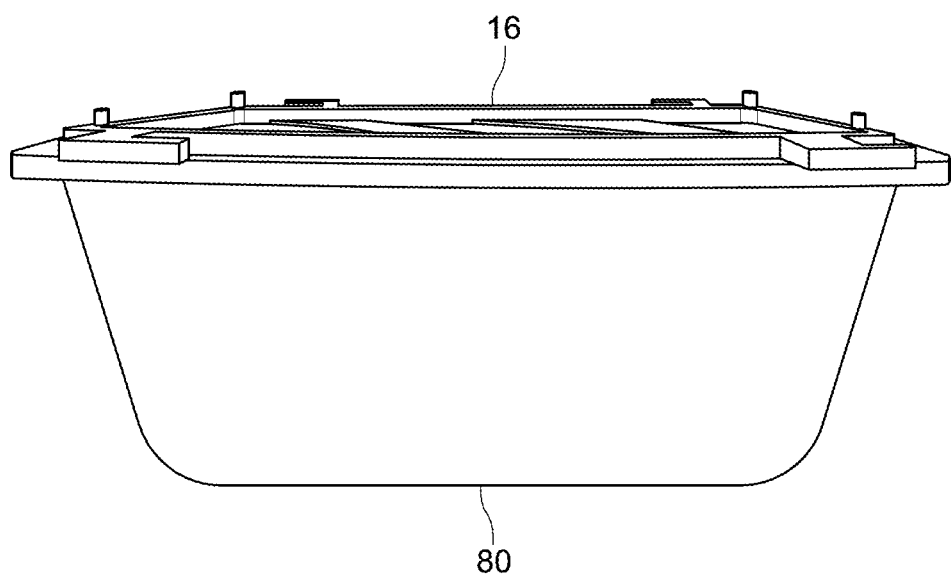
FIG. 8B is a side view of the rib panel of FIG. 8A.
Figure 9A:
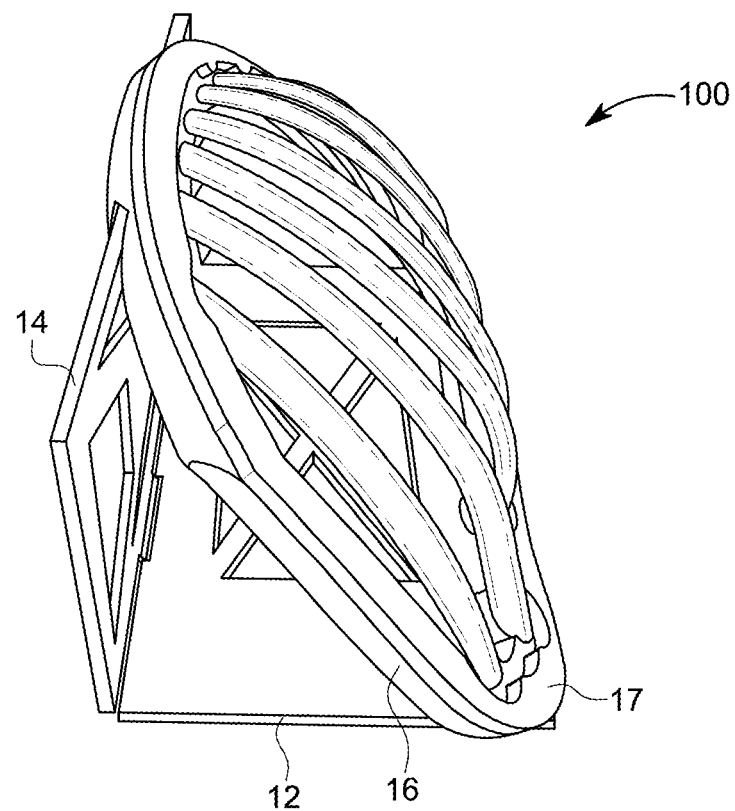
FIG. 9A is a side view of a second embodiment of the simulator apparatus of the present invention for the purpose of training chest tube insertion with the rib panel frame version of the invention.
Figure 9B:
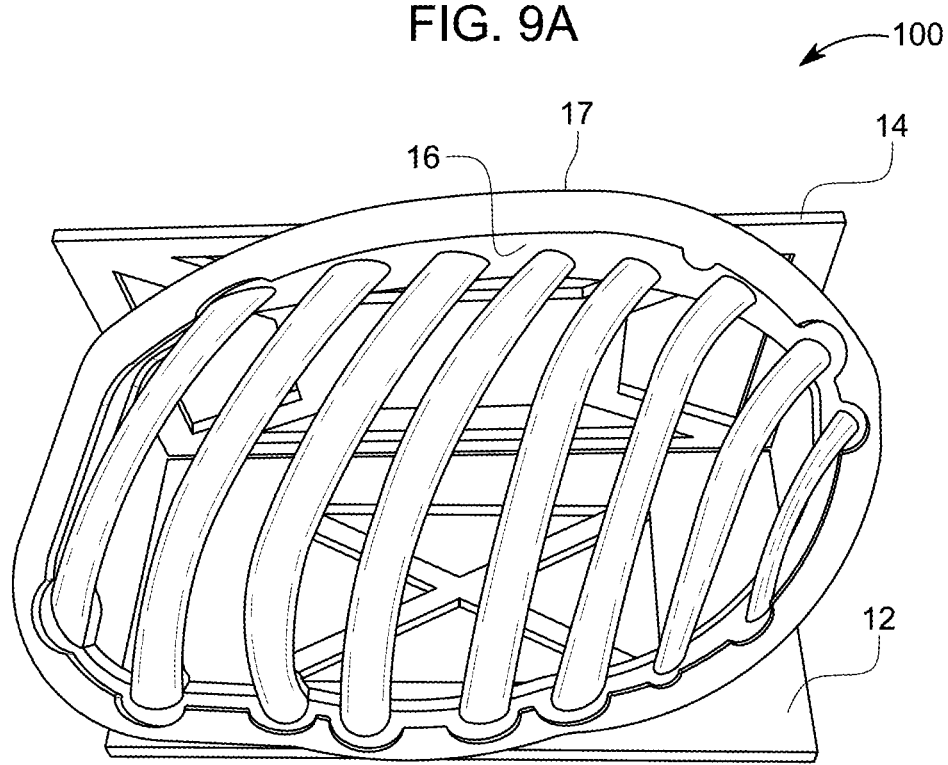
FIG. 9B is a front view of the simulator of FIG. 9A.
Figure 10A:
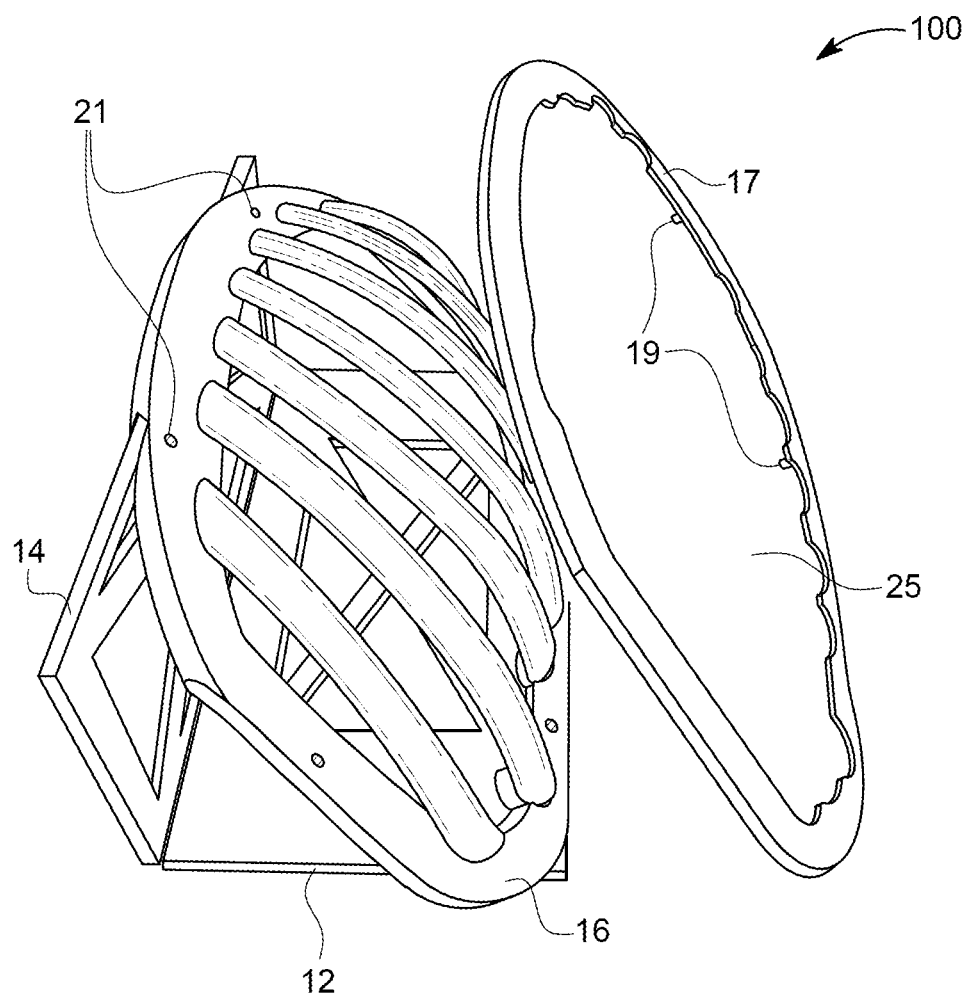
FIG. 10A is a side perspective view of the simulator of FIG. 9A with an exploded view of the rib panel frame.
Figure 10B:
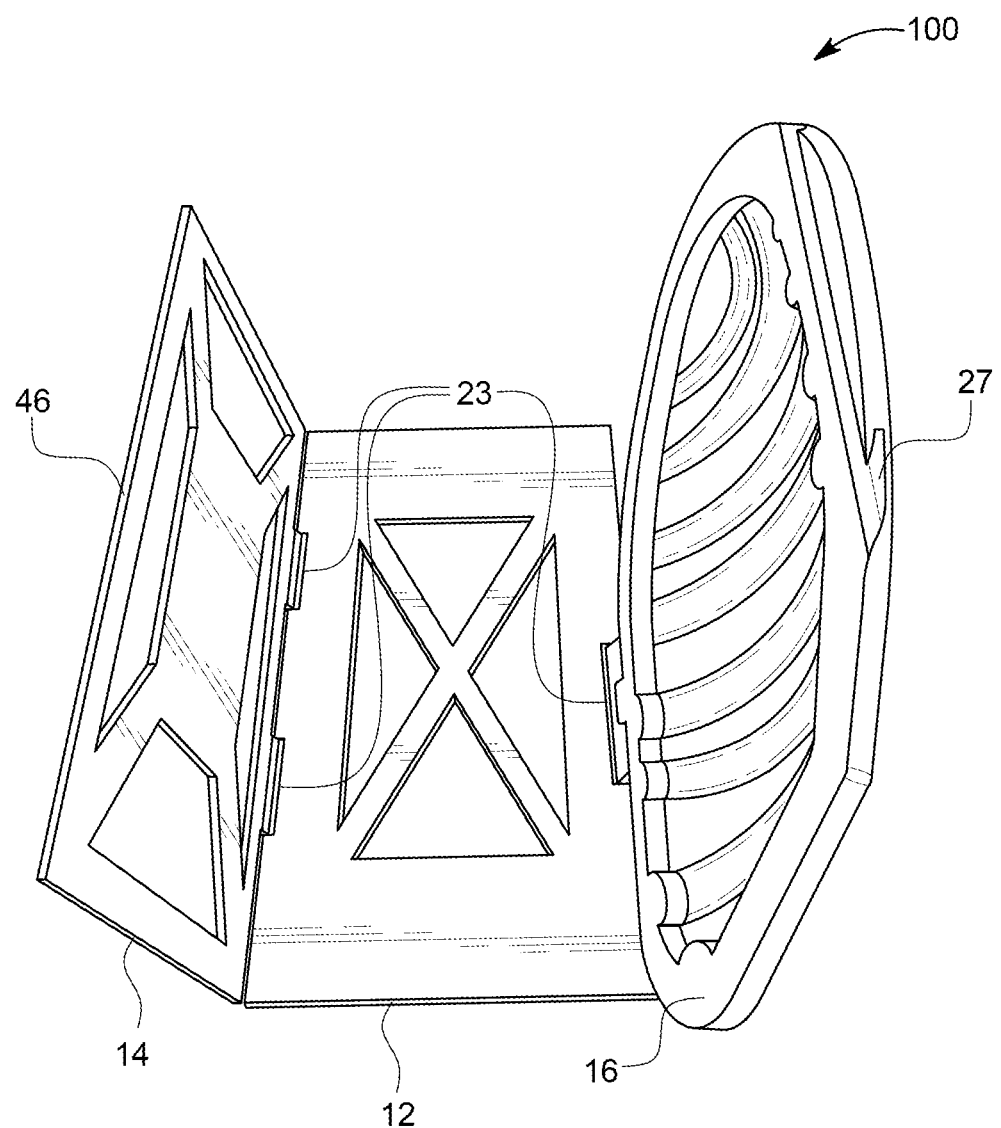
FIG. 10B is a side view of the simulator apparatus of the present invention with the rib panel frame depicting hinge elements joining the first stand element and second stand element and the first stand element and the rib panel.
Figure 10C:
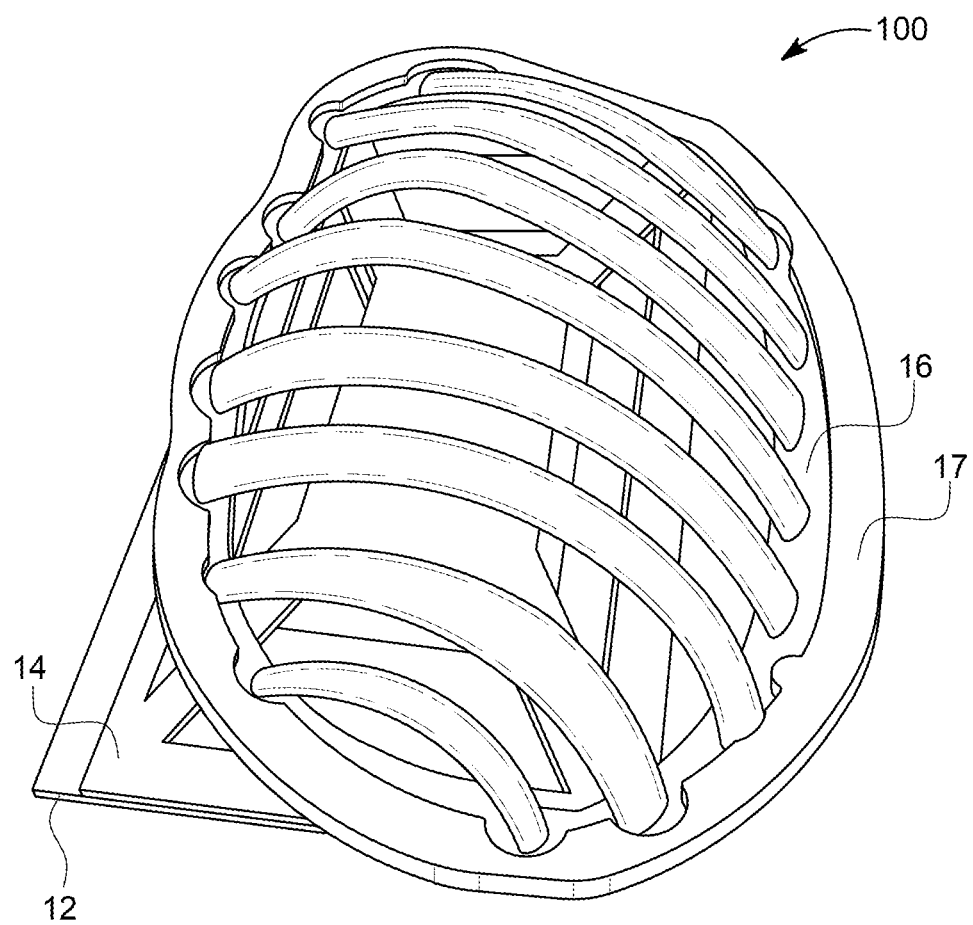
FIG. 10C is a side perspective view of the simulator of FIG. 9A collapsed to align the first stand element, the second stand element, the rib panel, and rib panel frame in a parallel fashion for easier transportation and storage.

A first medical training simulator apparatus 10 is shown in FIGS. 1-8B. The simulator apparatus 10 includes a first stand element 12 shown alone in FIGS. 1 and 2, a second stand element 14 shown alone in FIG. 3, and a rib panel 16 shown alone in FIGS. 5 and 6. FIG. 4 shows the first stand element 12 and the second stand element 14 joined together to form a base 18 of the simulator apparatus 10. FIGS. 7A and 7B show the rib panel 16 coupled to the base 18. FIGS. 8A and 8B show the rib panel 16 as a standalone component suitable to aid in training for pericardiocentesis positioned on a medical basin 80. FIGS. 9A and 9B show a second medical training simulator apparatus 100 with the rib panel 16 coupled to the base 18 and a rib panel frame 17. FIG. 10A depicts the apparatus 100 of FIGS. 9A and 9B with the rib panel frame 17 detached from the rib panel 16. FIG. 10B depicts the apparatus 100 of FIGS. 9A, 9B, and 10A in an expanded view wherein a multitude of hinge elements 23 connect the first stand element 12 with the second stand element 14 and the first stand element 12 with the rib panel 16. FIG. 10C shows the apparatus 100 in a collapsed configuration for ease of transport.

The first stand element 12 includes a primary body 20 with a first edge 22 and a second edge 24 opposite the first edge 22. A first clip 26 and a second clip 28 extend from the body 20 at the first edge 22. The first stand element 12 also includes a first rib panel receiving slot 30 and a second rib panel receiving slot 32 each extending partially or completely through a front side 34 to a back side 36 of the body 20 in substantial alignment with one another and set into the body 20 from the second edge 22. The first rib panel receiving slot 30 and the second rib panel receiving slot 32 are arranged to removably receive therein a portion of the rib panel 16. The number of clips may be more than two or fewer than two. The number of panel receiving slots may be more than two or less than two. The first stand element 12 may be made of any suitable material, including metallic or nonmetallic material. The nonmetallic material may be a viscoelastic material such as a polymeric material. For example, the first stand element 12 may be formed of polyethylene but not limited thereto.

The first stand element 12 optionally includes a spacing bar 38 extending from the second edge 24 on the backside 36 of the first stand element 12. The spacing bar 38 may extend partially or entirely a width of the body 20 and is of selectable height. The spacing bar 38 enables standoff of a portion 40 of the body 20 when on a substrate so that a component of the simulator 10 may be selectably and removably inserted into the slots 30 and 32.

The second stand element 14 includes a primary body 42 with a first edge 44 and a second edge 46 opposite from the first edge 44. The second stand element 14 also includes a first clip receiving port 48 and a second clip receiving port 50, each extending partially or completely through a front side 52 to a back side 54 of the body 42 in substantial alignment with one another and set into the body 42 from the first edge 44. The second stand element 14 further includes a first rib panel receiving slot 56 and a second rib panel receiving slot 58, each extending partially or completely through the front side 52 to the back side 54 in substantial alignment with one another and set into the body 42 from the second edge 46. The first clip receiving port 48 and the second clip receiving port 50 are arranged to removably retain therein the first clip 26 and the second clip 28 of the first stand element 12. The first rib panel receiving slot 56 and the second rib panel receiving slot 58 are arranged to removably receive therein a portion of the rib panel 16. The second stand element 14 may be made of any suitable material, including metallic or nonmetallic material. The nonmetallic material may be a viscoelastic material such as a polymeric material. For example, the second stand element 14 may be formed of polyethylene but not limited thereto.

FIG. 4 shows the first stand element 12 and second stand element 14 coupled together to form the base 18. Specifically, the clips 26 and 28 of the first stand element 12 are inserted into the clip receiving ports 48 and 50 of the second stand element 14 to form the base 18 having a substantially right-angle configuration with the slots 30 and 32 of the first stand element 12 angled and spaced from the slots 56 and 58 of the second stand element 14.

The rib panel 16 includes a primary body 60 with a first edge 62 and a second edge 64 opposite from the first edge 62. The rib panel 16 also includes a first rib wing 66 and a second rib wing 68 extending from the body 60 at the first edge 62, and a third rib wing 70 and a fourth rib wing 72 extending from the body 60 at the second edge 64. The rib panel is substantially symmetrical so that the first and second rib wings 66 and 68 may be removably inserted into the slots 30 and 32 of the first stand element 12 with the third and fourth rib wings 70 and 72 removably inserted into slots 56 and 58 of the second stand element 14, or the orientation of the rib wings may be reversed. FIGS. 7A and 7B show the simulator apparatus 10 put together with the first stand element 12 and second stand element 14 coupled together, as well as the rib panel 16 coupled to the first stand element 12 and the second stand element 14.

The rib panel 16 also includes a plurality of parallel curved slots 74 extending within a perimeter of the body 60, and corresponding parallel curved slats 76 alternating between the slots 74. The spacing, size and curvature of the slots 74 and slats 76 are arranged to represent a two-dimensional version of a human's ribs. Other configurations are possible provided the rib panel 16 is arranged to enable a user to simulate relevant medical activities of interest with and through the rib panel 16. For example, the rib panel 16 forming part of the simulator 10 shown in FIGS. 7A and 7B may be used to practice chest tube insertion, while the rib panel 16 alone shown in FIGS. 8A and 8B may be used to practice pericardiocentesis when removably placed on the medical basin 80.

FIGS. 9A and 9B show the second embodiment of the simulator apparatus 100 with the first stand element 12 and the second stand element 14 coupled together. The rib panel 16 is coupled to the first stand element 12 and the second stand element 14. The rib panel frame 17 is removably engaged with the rib panel 16. The rib panel 16 of the apparatus of 9A and 9B is arranged to depict the spacing, size, and curvature of the slots 74 and slats 76 to represent a three-dimensional version of a human's ribs.

FIG. 10A depicts the apparatus 100 with a multitude of pins 19 located on the rib panel frame 17 and a multitude of ports 21 located on the rib panel 16 wherein the pins 19 may be removably engaged with the ports 21 to attach the rib panel frame 17 to the rib panel 16. The pins 19 and ports 21 facilitate the coupling of the rib panel 16 to the rib panel frame 17. The rib panel frame 17 has a middle cavity 25, allowing access to the rib panel 16 by the user when the rib panel frame 17 is attached. The rib panel frame 17 secures the off-the-shelf subcutaneous tissue to the rib panel 16.

FIG. 10B depicts the apparatus 100 with the first stand element 12 and the second stand element 14 coupled together with the hinge elements 23. Additionally, the first stand element 12 and the rib panel 16 are coupled together with a hinge element 23. The apparatus 100 may have a multitude of hinge elements 23 to appropriately secure the panels together. The use of hinge elements 23 allows the user to fold the apparatus 100 into a more portable and easily transportable form. The apparatus 100 of FIG. 10B has a latch 27 which is configured to be removably engaged with the second edge 46 of the second stand element 14. The latch 27 facilitates the apparatus 100 to be secured in an "in use" position with the first stand element 12 and the second stand element 14 oriented in about a 90-degree angle, with the rib panel 16 oriented at about a 45-degree angle. The latch 27 may be uncoupled from the second edge 46 of the second stand element 14, allowing the hinge elements 23 to be utilized to fold the device down to a relatively flat orientation. The first stand element 12, the second stand element 14, and the rib panel 16 may lay flat relatively to each piece, such that the user may more easily transport the apparatus 100 while maintaining the coupling of the pieces of the apparatus 100. Alternatively, the user may utilize the apparatus 100 in its folded down manner with the rib panel 16 oriented parallel to the surface that the apparatus 100 is placed on.

FIG. 10C depicts the apparatus 100 of FIG. 9A wherein the hinge elements 23 allow the apparatus 10 to be collapsed down. The first stand element 12, the second stand element 14, the rib panel 16, and rib panel frame 17 are aligned in a parallel fashion to facilitate easier transportation and storage of the apparatus 100. The collapsed apparatus 100 of FIG. 10C is configured to be used on a flat surface or for easier transportation or storage.

The rib panel 16 optional includes one or more pegs 82 on at least one face of the body 60, which pegs may be used to removably retain to the rib panel 16 supplemental materials useful in carrying out a simulated procedure of interest. For example, practitioners can then place off-the-shelf subcutaneous tissue and skin overlay on the rib panel 16 for training in placing chest tubes and pigtail catheters, which overlays may be removably affixed to the pegs 82. The rib panel frame 17 provides another method in which to secure the off-the-shelf subcutaneous tissue and skin overlay to the rib panel 16. The rib panel 16 is designed to fit securely in the medical basin 18, with the slats 76 functioning as rib equivalents inset into the basin 80 slightly, with the opposing sets of wings 66 and 68 and 70 and 72 positioned at the most superior part of the frame of the basin 80. This allows a simulation heart, created with off-the-shelf materials, to be placed in the basin 80 which is then filled with water, water and fiber supplement, or gelatin to create an echogenic model that can utilize ultrasound for the training in ultrasound guided pericardiocentesis through the rib panel 16. The rib panel 16 may be made of any suitable material, including metallic or nonmetallic material. The nonmetallic material may be a viscoelastic material such as a polymeric material. For example, the rib panel 16 may be formed of polyethylene but not limited thereto.

The present invention has been described with reference to specific examples and configurations. It is only intended to be limited to the description set out in the claims and equivalents.

What is claimed is:

1. An apparatus for training medical professionals in a chest tube insertion procedure, the apparatus comprising:
   a first stand element having a front side, a back side, a first edge, a second edge opposite the first edge, two or more clips extending from the first edge, and two or more rib panel receiving slots inset from the second edge extending through the front side to the back side;
   a second stand element having a front side, a back side, a first edge, a second edge opposite the first edge, two or more clip receiving ports inset from the first edge extending through the front side to the back side, and two or more rib panel receiving slots inset from the second edge extending through the front side to the back side; and
   a rib panel having a front side, a back side, a first edge, a second edge opposite the first edge, two or more rib wings extending from the first edge, two or more rib wings extending from the second edge, and a plurality of slots extending through the front side to the back side, wherein the plurality of slots are curved to simulate spaces between an animal's ribs,
   wherein the two or more clips of the first stand element are removably insertable into the two or more clip receiving ports of the second stand element,
   wherein the two or more rib wings of the first edge of the rib panel are arranged for removable insertion into the two or more rib panel slots of the first stand element, and
   wherein the two or more rib wings of the second edge of the rib panel are removably insertable into the two or more rib panel slots of the second stand element.

2. The apparatus of claim 1, wherein the two or more clips of the first stand element and the two or more clip receiving ports of the second stand element are arranged so that the first stand element and the second stand element are substantially at a right angle to one another to form a base of the apparatus when the two or more clips of the first stand element are inserted into the two or more clip receiving ports of the second stand element.

3. The apparatus of claim 2, wherein the rib panel is arranged so that when inserted into the first stand element and the second stand element of the base, the rib panel is angled at about 45 degrees from the second edge of the first stand element to the second edge of the second stand element.

4. The apparatus of claim 1, wherein the first stand element, the second stand element, and the rib panel are made of a nonmetallic material.

5. The apparatus of claim 1, wherein the rib panel includes a plurality of pegs on the back side thereof.

6. A rib panel arranged to assist in training medical professionals in a pericardiocentesis procedure, the rib panel comprising:
   a front side;
   a back side;
   a first edge;
   a second edge opposite the first edge;
   two or more rib wings extending from the first edge;
   two or more rib wings extending from the second edge; and
   a plurality of slots extending through the front side to the back side, wherein the plurality of slots are curved to simulate spaces between an animal's ribs.

7. The rib panel of claim 6, wherein the rib panel is made of a nonmetallic material.

8. The rib panel of claim 6, further comprising a plurality of pegs on the back side thereof.

9. An apparatus for training medical professionals in a chest tube insertion procedure, the apparatus comprising:
   a first stand element having a front side, a back side, a first edge, a second edge opposite the first edge, one or more hinge elements located on the first edge, and one or more hinge elements located on the second edge,
   a second stand element having a front side, a back side, a first edge, a second edge opposite the first edge, and one or more hinge elements located on the first edge,
   a rib panel having a front side, a back side, a first edge, a second edge opposite the first edge, one or more hinge elements located on the first edge, and a plurality of slots extending through the front side to the back side, wherein the plurality of slots are curved to simulate spaces between an animal's ribs, and
   a rib panel frame having a front side, a back side, a rim, and a middle cavity,
   wherein the one or more hinge elements of the first edge of the first stand element are removably engaged with the one of more hinge elements of the first edge of the second stand element,
   wherein the one of more hinge elements of the first edge of the rib panel are removably engaged with the one or more hinge elements of the second edge of the first stand element, and
   wherein the second edge of the rib panel is removably engaged with the second edge of the second stand element.

10. The apparatus of claim 9, wherein the one or more hinge elements of the first edge of the first stand element and one of more hinge elements of the first edge of the second stand element are arranged so that the first stand element and the second stand element are substantially at a right angle to one another to form a base of the apparatus.

11. The apparatus of claim 10, wherein the one of more hinge elements of the first edge of the rib panel and the one of more hinge elements of the second edge of the first stand element are arranged so that the rib panel is angled at about 45 degrees from the second edge of the first stand element to the second edge of the second stand element.

12. The apparatus of claim 10, wherein the rib panel frame is configured such that the rim is shaped to mirror the shape of the rib panel.

13. The apparatus of claim 10, wherein the first stand element, the second stand element, the rib panel, and the rib panel frame are made of a nonmetallic material.

14. The apparatus of claim 10, wherein the rib panel frame includes a plurality of pegs on the back side thereof, and the rib panel includes a plurality of peg holes on the front side thereof, configured to be removably engaged with the pegs of the back side of the rib panel frame.

15. The apparatus of claim 10, wherein the second edge of the rib panel has a slot configured to receive the second edge of the second stand element to secure the rib panel in place, aligned at about a 45 degree angle from the from the second edge of the first stand element to the second edge of the second stand element.

16. The apparatus of claim 10, wherein the hinge elements are arranged so that the first stand element, second stand element, and rib panel are aligned parallel in reference to each other.

* * * * *